United States Patent

Dichiara, Jr. et al.

[11] Patent Number: 6,074,699
[45] Date of Patent: *Jun. 13, 2000

[54] SURFACE HARDNESS OF ARTICLES BY REACTIVE PHOSPHATE TREATMENT

[75] Inventors: Robert A. Dichiara, Jr., San Diego; Robert W Kreutzer, Poway, both of Calif.

[73] Assignee: McDonnell Douglas Corporation, Huntington Beach, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/235,370

[22] Filed: Apr. 29, 1994

[51] Int. Cl.$^7$ ........................................................ B05D 3/10
[52] U.S. Cl. ........................... 427/344; 427/343; 427/380; 427/399; 427/419.2; 427/419.3; 428/446; 428/704
[58] Field of Search .................................. 427/399, 419.2, 427/419.3, 343, 344, 380; 428/446, 704

[56] References Cited

U.S. PATENT DOCUMENTS

| | | | |
|---|---|---|---|
| 3,873,344 | 3/1975 | Church et al. | 427/380 |
| 3,944,683 | 3/1976 | Church et al. | 427/226 |
| 3,956,531 | 5/1976 | Church et al. | 427/226 |

*Primary Examiner*—Janyce Bell
*Attorney, Agent, or Firm*—Alston & Bird LLP

[57] ABSTRACT

An article has at its surface a nonmetallic ceramic form of a cation reactive with phosphate ion to form a ceramic phosphate, such as an oxide of a cation selected from the group consisting of beryllium, aluminum, iron, magnesium, calcium, thorium, barium, zirconium, zinc, silicon, and mixtures thereof. A source of reactive phosphate ions, such as concentrated phosphoric acid or monoaluminum phosphate, is applied to the surface of the article. The surface of the article is thereafter heated to cause the nonmetallic ceramic form of the cation and the source of the reactive phosphate ions to react together, producing a phosphate-bonded hard layer at the surface of the article.

20 Claims, 2 Drawing Sheets

SURFACE HARDNESS OF ARTICLES BY REACTIVE PHOSPHATE TREATMENT

BACKGROUND OF THE INVENTION

This invention relates to forming a hard, protective surface on a body, and, more particularly, to forming a phosphate-bonded layer at the surface of the body.

In many applications, a light, strong, fracture-resistant material with a hard, erosion-resistant surface is desired. For example, an externally exposed component of an aircraft should be light, strong, and tough, so that it does not fracture easily under loadings. The component should also be resistant to erosion resulting from particulate matter in the air, which, due to its high velocity, can rapidly wear away unprotected surfaces.

The objectives of light weight, high strength and fracture resistance, on the one hand, and surface erosion resistance, on the other hand, are often difficult to attain in a single, unitary piece of material. Light-weight, fracture-resistant materials usually include at least some relatively soft, ductile phases or components that are readily worn away at the exposed surfaces. Conversely, hard, erosion-resistant materials usually exhibit low ductilities and fracture properties.

To overcome these difficulties, it is well known to use light-weight, high-strength, fracture-resistant materials for structural components, but to protect the surface of the components with erosion-resistant surface layers. In some cases, the erosion-resistant surface layers are in the form of coatings of ceramic-based materials that are bonded to the components at their surfaces. In other cases, the surface layers are obtained by modifying the basic structure of the component at its surface, as by carborizing or the like. In one approach, a ceramic material such as alumina or silica is formed at the surface of the component to be protected. Alumina has the virtue of being hard and erosion resistant, but also resistant in chemical erosion and oxidation.

Many different surface treatment techniques are known. However, there always remains the desire and need to further improve the results by increasing the hardness and erosion resistance of the surface without sacrificing its other desirable properties. The present invention fulfills this need, and further provides related advantages.

SUMMARY OF THE INVENTION

This invention provides a method for preparing a wear-resistant surface, and surfaces and articles so prepared. The treatment further improves the hardness and wear resistance of ceramic protective surfaces, such as those already in place on a surface and formed of certain reactive oxides. The treatment can be applied to a wide range of ceramic materials, which in turn are present at the surfaces of a wide range of substrate articles. The approach of the invention can be used in the initial treatment of a surface, of during field repairs. It is relatively inexpensive to use and is highly effective. Irregular surfaces can be treated, because line-of-sight access to the surface is not required.

In accordance with the invention, a method for preparing a wear resistant surface comprises the steps of providing an article having at its surface a nonmetallic ceramic form of a cation reactive with phosphate ion to form a ceramic phosphate, and applying to the surface of the article a source of reactive phosphate ions. The surface of the article is thereafter heated to cause the nonmetallic ceramic form of the cation and the source of the reactive phosphate ions to react together. The result is a phosphate-bonded coating on the surface, which is hard and highly resistant to surface damage.

The underlying article, forming a substrate for the protected surface, can be of a wide variety of materials, including, for example, a metal, a metal-matrix composite, a ceramic, a ceramic-matrix composite, an organic material, and an organic-matrix composite. The ceramic form at the surface of the article prior to application of the source of phosphate ions is preferably an oxide of a cation such as beryllium, aluminum, iron, magnesium, calcium, thorium, barium, zirconium, zinc, silicon, and mixtures thereof. This list includes important surface protective materials such as alumina, silica, and magnesium-aluminum-silicon oxide. The source of phosphate ions is preferably a liquid such as concentrated phosphoric acid, but may also be other sources such as monoaluminum phosphate. The source is applied to the ceramic surface by any appropriate means, such as brushing or spraying.

The resulting treated surface is substantially harder than the untreated surface, with little change in dimension or weight. Because the heating step requires only intermediate temperatures such as about 600–800° F. to accomplish the ceramic/phosphate reaction, the heating can be performed either by placing the entire article into a furnace, or by using a heat lamp or similar device to heat only the surface regions. The latter capability permits field repairs to be conducted readily, as, for example, where there has been damage to the surface that has removed a portion of the phosphate-bonded layer.

The present invention is of particular interest in protecting porous ceramic articles such as porous ceramic tiles formed by pressing and sintering masses of ceramic fibers. In accordance with this aspect of the invention, a method for preparing a wear-resistant surface comprises the step of furnishing a body made of a first ceramic material and having porosity extending through at least a portion of the body adjacent to a first surface of the body. The method further includes preparing a slurry of a mixture comprising a ceramic powder made of a second ceramic material that is a nonmetallic ceramic form of a cation reactive with phosphate ion to form a ceramic phosphate, and a source of a silica-containing binding agent. The slurry is impregnated into the first surface of the body, and dried in place within the porosity of the body to leave a mixture of ceramic powder and binding agent within the porosity. The mixture of ceramic powder and binding agent is fired to cause the binding agent to bind the ceramic powder to the interior of the porosity of the body. The method provides for applying to the surface of the article a source of reactive phosphate ions, drying the source if necessary, and heating the surface of the article to cause the nonmetallic ceramic form of the cation and the source of the reactive phosphate ions to react together. As before, the result is a hard, erosion-resistant phosphate-bonded ceramic coating at the surface of the article.

The present invention provides an advance in the art of surface-protected articles. A ceramic surface having good hardness can be enhanced to have even greater hardness with a relatively easily performed surface treatment. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
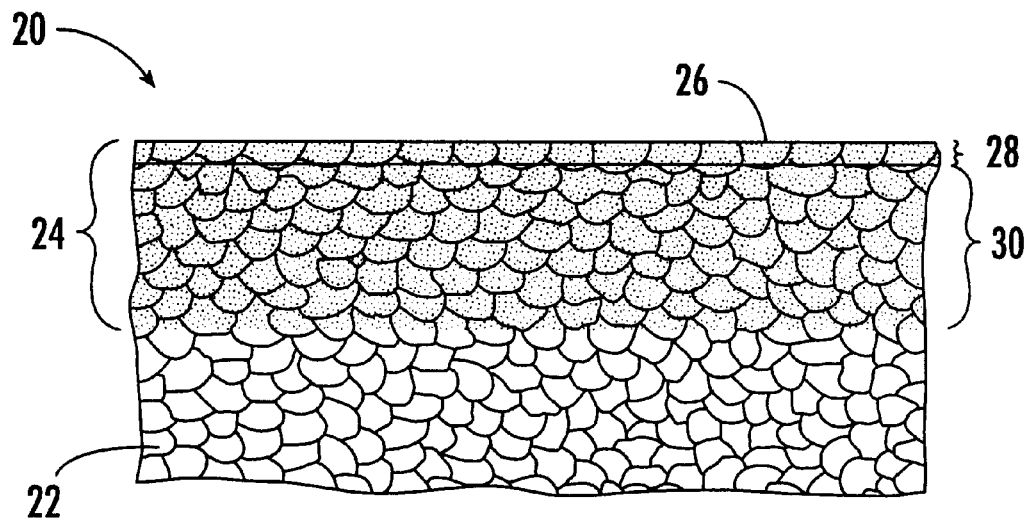
FIG. 1 is a schematic side sectional view of a porous ceramic body protected by the present approach.

As depicted in FIG. 1, the present invention is preferably embodied in an article 20 comprising a porous ceramic body 22 having protective material in the form of a protective region 24. The protective region 24 lies immediately below a surface 26 of the ceramic body 22. It is formed by the protective material residing in the porosity of the ceramic body 22. The protective region 24 is substantially entirely below the surface 26 of the ceramic body 22, with only an unintended incidental amount that may lie on or above the surface 26. As will be discussed in more detail subsequently, the protective region 24 is formed by impregnating a reactive ceramic such as cordierite powder, mixed with a binding agent, into the porous surface of the ceramic body 22, and then firing the mixture.

The protective region 24 typically has two zones. A first zone 28 iles immediately adjacent to the surface 26. It includes a phosphate-bonded ceramic material formed by reacting the material of the protective region 24 with reactive phosphate ions, in a manner to be discussed subsequently. A second zone 30 includes the unmodified result of the firing of the mixture of reactive ceramic powders and binding agent. It is not phosphate-bonded because the source of phosphate ions is not able to penetrate to the full depth of the protective region 24 during the treatment.

Figure 2:
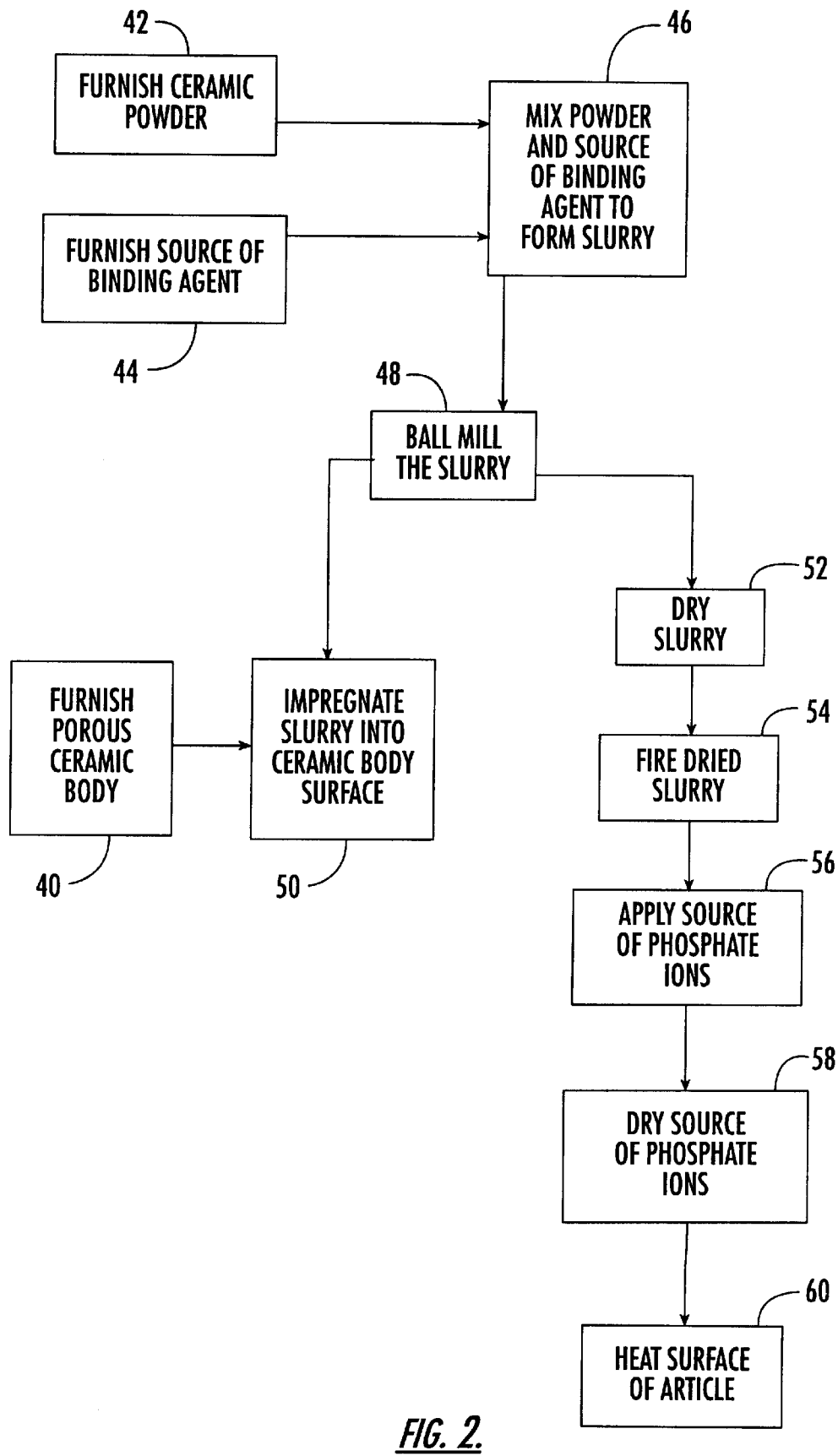
FIG. 2 is a block diagram of a preferred method for practicing the present invention.

FIG. 2 depicts a process for preparing the protected article 20 of FIG. 1. A porous ceramic body 22 is furnished, numeral 40. A number of techniques are known for preparing such a body. Preferably, the ceramic body 22 is made of a first ceramic material by forming a mat of ceramic fibers and then sintering the mat to leave porosity between the fibers. In one known approach, silica fibers, aluminoborosilicate fibers, and alumina fibers are placed into a mold. Various types of particulates and a binder may also be used. A vacuum is drawn on one side of the mold to collapse the fibers into a mat, with other additives captured inside the mat. The mat is heated to a temperature of about 2500° F. to sinter the fibers into a solid ceramic body 22 having porosity therein. The nature of the porosity can be controlled by the manufacturing technique. FIG. 1 schematically depicts a generally equlaxed porosity, but it may be of other geometries as well. Other compositions of the ceramic body and other approaches for preparing the ceramic body can also be used.

A slurry is prepared by a series of steps 42, 44, 46, and 48. To prepare the slurry, a ceramic powder is furnished, numeral 42. The ceramic powder is desirably equlaxed particles made of a second ceramic material composed of a nonmetallic ceramic form of a cation reactive with phosphate ion to form a ceramic phosphate. The ceramic powder particles preferably have an average particle size of no greater than about two micrometers. The small particle size permits the particles to penetrate into the porosity during subsequent processing. Larger particles that cannot penetrate the porosity are retained on the surface and are wiped away during the application procedure.

The second ceramic material may be any operable ceramic material, but is preferably the ceramic cordierite having a composition $MgAlSiO_3$. An operable cordierite powder having an average particle size of about 2 micrometers is available commercially.

Other operable ceramics, and mixtures of the various ceramics, can also be used. The second ceramic form of a cation is reactable with the source of phosphate ions to produce a cementitious ceramic phosphate compound. The preferred reactive ceramic form is a reactive oxide. The reactive phosphate ion reacts with several oxides of a weakly basic or amphoteric nature to produce phosphate forms. Optimum bonding is produced using weakly basic or amphoteric cations having moderately small ionic radius. Oxides of cations from the following group are particularly preferred: beryllium, aluminum, iron, magnesium, calcium, thorium, barium, zirconium, zinc, and silicon. Such oxides also include complex oxides, such as aluminum magnesium oxides. Mixtures of the various reactive species are also operable, particularly to achieve desirable combinations of properties in the final phosphate structure. Other reactive ceramic forms that react to produce phosphate bonded phases such as magnesium phosphate, $Mg_3(PO_4)_2$, are also operable.

A source of a silica-containing binding agent is furnished, numeral 44. The binding agent is preferably a commercially available silica sol, comprising small silica particles in the size range of from about 4 to about 150 nanometers. The silica particles are mixed with a carrier liquid, such as water with a small amount of ammonia. The silica particles are typically present in an amount of from about 15 to about 50 percent by weight of the mixture of silica and liquid, producing a mixture having a viscosity comparable with that of water.

Other binders can be used, but are less preferred. For example, alumina-coated silica sols and alumina sols are also available and can be used.

Cordierite and silica are the preferred combination of ceramic powder and binder because they have the necessary reactivity and thermal expansion properties. The subsequent processing results in a protected ceramic body having its surface in compression. A compressive stress state at the surface aids in inhibiting the initiation of surface cracks, thereby improving the resistance of the article 20 to premature fracture.

Appropriate amounts of the ceramic powder and the binder are mixed together, numeral 46. In a preferred approach, from about 23 to about 29 parts by weight of cordierite powder and from about 71 to about 77 weight parts by weight of silica sol are mixed together. The mixture is mixed in a propeller mixer to form a uniform mixture. These proportions yield a mixture in the form of a slurry having a consistency comparable with that of water.

In some applications, it is desirable to achieve a particular emissivity of the ceramic material so that the amount of heat introduced from the environment is controllable. In such cases, known emissivity-controlling agents can be provided in the slurry. In a preferred approach, the emissivity is varied by the addition of molybdenum disilicide ($MoSi_2$) powder to the slurry. Most preferably, molybdenum disilicide powder is substituted for about 10 to about 40 percent by weight of the second ceramic material, which is most preferably, cordierite. After subsequent processing, the surface region of the ceramic body has a concentration of the molybdenum disilicide that modifies its emissivity.

The slurry is further mixed in a high shear mixer or a ball mill, numeral 48. A typical high shear mixing is accomplished at 3000 rpm for 3 minutes, or a typical ball milling is accomplished in four hours. The effect of the further mixing 48 is to break down agglomerated (softly bound together) groups of ceramic powder particles, producing a good dispersion of the ceramic powder particles in the silica sol.

The resulting slurry, having a consistency similar to that of water, is applied to the ceramic body 22 so as to impregnate the slurry into the porosity of the ceramic body 22, numeral 50. The application is preferably performed with a mechanical contact pressure to aid in forcing the slurry into the pores, but may also be performed by non-contact techniques such as spraying or dipping. In the preferred approach, the slurry is applied using a squeegee or a brush. The amount of the slurry actually introduced into the porosity of the ceramic body is controlled by the amount that is applied to the surface during this application procedure. Although in theory ceramic particles too large to penetrate into the porosity are retained on the surface and can be removed. In practice it has been observed that very little of the properly prepared slurry which is applied to the surface of the ceramic body does not enter the porosity. The amount of slurry, and hence ceramic powder, impregnated into the surface of the ceramic body 22 can therefore be closely controlled. The amount of slurry is desirably such that, after firing, there is an increase in weight of the ceramic body of from about 1.0 to about 6.0 grams per square inch of treated surface area. In the preferred practice, the slurry is provided in an amount of about 3 grams per square inch of protected surface area. This results in an increase in weight of the ceramic body, due to the dried and fired slurry material, of about 2.2 grams per square inch of protected surface area.

After the desired amount of the slurry has been introduced, the slurry is dried at a temperature of from about 180° F. to about 300° F., most preferably about 230° F., numeral 52. The liquid in the slurry is released in the atmosphere during the drying process, leaving a residual solid composed of ceramic particles and silica within the pores. The terminology "drying the slurry" is used herein rather than "heating the ceramic body", because the drying can be accomplished by surface heating techniques such as heat lamps, without heating the entire ceramic body, if desired. Drying can also be accomplished by heating the entire ceramic body, as in a furnace.

The solid residual matter within the pores is fired, numeral 54, to cause the silica binding agent to bind the ceramic particles to the walls of the pores. The firing is accomplished by heating the residual matter to a temperature of about 500° F. or more, most preferably from about 700° F. to about 1000° F. Again, only the solid residual matter at the surface of the ceramic body, not the entire ceramic body, need be heated. In the preferred approach, the firing step is completed in about ½ hour in air. The result of firing is the ceramic body 22 having the protective region 24 shown in FIG. 1.

The drying and firing steps can be conducted by heating the entire ceramic body to the required temperatures. Alternatively, the required temperatures can be achieved using a surface heating source such as a quartz heat lamp directed against the surface into which the slurry was introduced. In the latter approach, only the surface regions are heated, and in particular it is necessary only to heat the ceramic body 22 to the firing temperature in the protective region 24.

A source of reactive phosphate ions is applied to the surface 26 of the ceramic body 22, and thus to the surface of the protective region 24, numeral 56. The reactive source of phosphate ions is preferably concentrated phosphoric acid, having a concentration of at least about 85 percent phosphate ions in aqueous solution. Other sources such a monoaluminum phosphate can also be used. "Monoaluminum phosphate" is available commercially as a mixture containing monoaluminum phosphate, $Al(H_2PO_4)_3$, and related species such as $AlH_3(PO_4)_2.H_2O$ and $Al_2(HPO_4)_3$, and such mixtures are operable and acceptable in the present approach.

The preferred source of phosphate ions is an aqueous solution of phosphate ions. During the application step 56, some of the water in the source penetrates into the interior of the ceramic body 22. The water is removed by drying the ceramic body 22, numeral 58, typically at a temperature of about 95° F. for a period of about 1–2 hours. Such slow drying is preferred in order to prevent the accumulation of steam below the surface of the ceramic body during subsequent processing.

The surface of the article 20 is healed, numeral 60, to cause the phosphate ions to react with the reactive ceramic. Heating to a temperature of from about 600° F. to about 800° F. is preferred, with the most preferred heating bring to a temperature of 750° F. for about 1 hour.

As discussed previously in relation to step 52 and 54, the drying and heating steps 58 and 60 may be accomplished in a single heating operation, or with an intermediate cooldown. The drying and firing steps 58 and 60 can be conducted by heating the entire ceramic body to the required temperatures, or by using a surface heating source such as a quartz heat lamp directed against the surface into which the slurry was introduced. In the case of heating step 60, the ceramic body 22 need be heated to the ceramic/phosphate reaction temperature to the depth of the first zone 28.

The ability to use surface heating sources such as heat lamps for all of the steps 52, 54, 58, and 60 permits in-situ repair and patching of ceramic tiles without removing them from the airframe to which they are attached. That is, if a ceramic article such as a protective thermal tile is damaged during service, the protective region of the present invention can be re-formed by applying the slurry to the damaged area. High-intensity lamps are directed against the area to dry and fire the ceramic mixture. The source of phosphate ions is then applied, and dried and reacted using the same heat lamps or other heating source. The required temperatures to complete the various drying and firing steps are such that the ceramic protects the underlying airframe structure from the heat.

Recalling that the ceramic body is of a generally porous structure, it is often desirable to coat the final body with a sealing agent against water penetration. The present approach is fully compatible with the use of sealants, including those presently known in the art. Preferably, when water sealing is desired, a low-viscosity silane coating is applied by any appropriate technique, such as brushing, dipping, or spraying, after all other processing is complete. The silane coating acts as a water seal to prevent water liquid or vapor from penetrating into the surface regions and the interior of the ceramic body. The silane coating is stable to a temperature of about 800° F. If the surface temperature exceeds about 800° F. during service or testing, the sealing coating must be reapplied prior to subsequent use.

Figure 3:
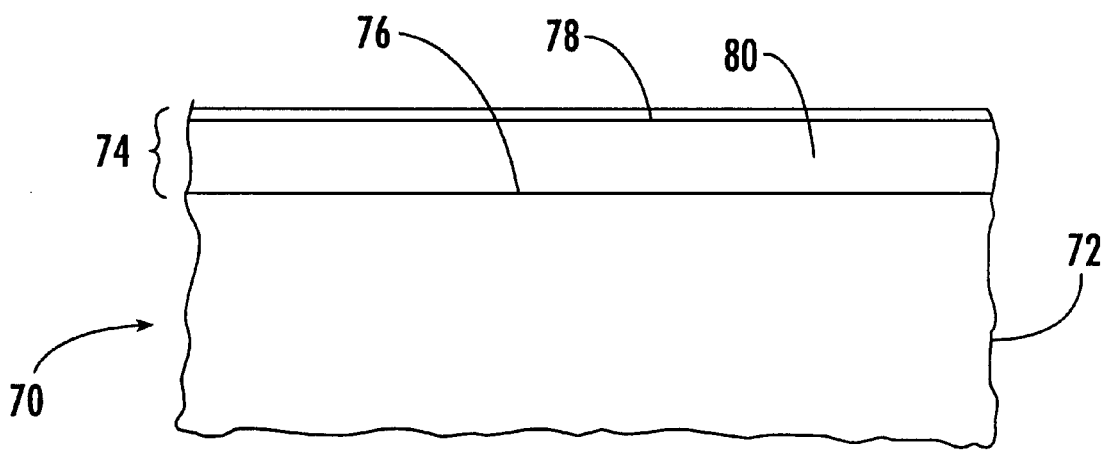
FIG. 3 is a schematic side sectional view of a non-porous body protected by the present approach.

The preferred embodiment of the invention, just discussed, is directed toward protecting a porous ceramic body. The invention is also operable with other articles, as depicted in FIG. 3. Here, the article 70 comprises a solid body 72, without substantial porosity. The solid body 72 can be made of any material to which the required protective coating can adhere, and which can withstand the required drying and heating temperatures. For example, the solid body can be a metal, a metal-matrix composite, a ceramic, or a ceramic-matrix composite. An organic material or an organic-matrix composite can also be used, if it will withstand the subsequent processing temperatures. A protective region 74 is applied to a surface 76 of the body 72. The protective region can be applied by the same steps 40, 42, 44, 46, 48, 50, 52, and 54 as discussed previously, although the slurry does not impregnate below the surface 76 in step 50. Since the slurry cannot flow to the subsurface regions, it is not necessary that the ceramic particles of the slurry be small and that a silica sol be used as the binding agent instead of larger silica frit. Thus, alternative approaches to providing the protective region 74 can also be used. For example, larger particles can be used in a modified slurry approach as shown in FIG. 2. The protective region can also be produced by other delivery techniques such as evaporation, sputtering, plasma spraying, and the like. It is only required that there be deposited on the surface a nonmetallic ceramic form of a cation reactive with phosphate ion to form a ceramic phosphate. Such forms have been discussed previously.

After the protective region 74 has been applied by any operable approach, steps 56, 58, and 60 of FIG. 2 are performed in the manner previously discussed. The result, as shown in FIG. 3, is that the protective region 74 has two zones, a first zone 78 at the very surface of protective region 74 and a second zone 80 between the first zone 78 and the surface 76 of the solid body 72. The first zone 78 is a phosphate-bonded ceramic resulting from the reaction of the reactive phosphate ions with the reactive ceramic of the protective region 74. The second zone is as deposited reactive ceramic material which has not reacted with the phosphate ions because the phosphate ions cannot penetrate into the dense, nonporous protective region. The first zone 78 of this embodiment is typically thinner than the first zone 28 of the embodiment based on the porous ceramic body 22, inasmuch as the source of reactive phosphate ions cannot as readily penetrate into a nonporous body.

The preferred embodiment of FIGS. 1 and 2 was practiced as described herein, and surface hardness measurements were taken at intermediate stages of the processing. The initial porous ceramic body had a surface hardness of about 20, using a Type D durometer and following the procedure of ASTM 2240-25. After the initial protective region 24 was formed, through step 54 of FIG. 2, the surface hardness was about 60. After the phosphate treatment was complete, through step 60 of FIG. 2, the surface hardness was about 100. Thus, the phosphate treatment produced a five-fold increase in surface hardness as compared with the as furnished porous ceramic, and a 67 percent increase in surface hardness as compared with the porous ceramic processed to have the protective region (but no phosphate processing). These increases in hardness result in increases in wear resistance of the ceramic material, without greatly altering its density or other properties.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing a wear-resistant surface, comprising the steps of:
   preparing a slurry comprising an oxide capable of reacting with phosphate ions, a binding agent, and an emissivity-controlling agent;
   applying the slurry to the surface of an article;
   drying the slurry;
   applying a source of reactive phosphate ions to the surface of the article; and thereafter
   heating the surface of the article to cause the oxide and the source of the reactive phosphate ions to react together to form a ceramic phosphate.

2. The method according to claim 1, wherein said step of applying the slurry to the surface of an article comprises applying the slurry to the surface of an article made from a material selected from the group consisting of a metal, a metal-matrix composite, a ceramic, a ceramic-matrix composite, an organic material, and an organic-matrix composite.

3. The method according to claim 1, wherein said step of applying a source of reactive phosphate ions to the surface of the article comprises applying a source of reactive phosphate ions selected from the group consisting of phosphoric acid and monoaluminum phosphate.

4. The method according to claim 1, wherein said step of preparing a slurry comprises preparing a slurry wherein the oxide is an oxide of a cation selected from the group consisting of beryllium, aluminum, iron, magnesium, calcium, thorium, barium, zirconium, zinc, silicon, and mixtures thereof.

5. The method according to claim 4, wherein said step of preparing a slurry comprises preparing a slurry wherein the oxide is cordierite ($MgAlSiO_3$).

6. The method according to claim 1, wherein said step of applying a source of reactive phosphate ions to the surface of the article comprises applying an aqueous source of reactive phosphate ions.

7. The method according to claim 1, wherein said second step of heating the surface of the article comprises heating the surface of the article to a temperature of at least about 600° F.

8. The method according to claim 1, wherein said step of applying the slurry to the surface of an article comprises applying the slurry to the surface of a porous article.

9. The method according to claim 1, wherein said step of preparing a slurry comprises preparing a slurry wherein the binding agent includes silica.

10. The method according to claim 1, wherein said step of preparing a slurry comprises preparing a slurry wherein the emissivity-controlling agent is molybdenum disilicide.

11. An article prepared according to the method of claim 1.

12. A method for preparing a wear-resistant surface, comprising the steps of:
   preparing a slurry comprising an oxide powder capable of reacting with phosphate ions, a silica-containing binding agent, and molybdenum disilicide;
   applying the slurry to the surface of a porous article;
   drying the slurry;
   applying an aqueous source of reactive phosphate ions to the surface of the article; and thereafter
   heating the surface of the article to cause the oxide and the source of the reactive phosphate ions to react together to form a ceramic phosphate.

13. The method according to claim 12, wherein said step of applying a source of reactive phosphate ions to the surface of the article comprises applying a source of reactive phosphate ions selected from the group consisting of phosphoric acid and monoaluminum phosphate.

14. The method according to claim 12, wherein said step of preparing a slurry comprises preparing a slurry wherein the oxide is an oxide of a cation selected from the group consisting of beryllium, aluminum, iron, magnesium, calcium, thorium, barium, zirconium, zinc, silicon, and mixtures thereof.

15. The method according to claim 14, wherein said step of preparing a slurry comprises preparing a slurry wherein the oxide is cordierite ($MgAlSiO_3$).

16. An article prepared according to the method of claim 1.

17. A method for preparing an article with a wear-resistant surface, comprising the steps of:

furnishing an article made of a first ceramic material and having porosity extending through at least a portion of the body adjacent a first surface of the article;

preparing a slurry of a slurry comprising an oxide powder capable of reacting with phosphate ions, a silica-containing binding agent, and an emissivity-controlling agent;

impregnating the first surface of the article with the slurry;

drying the slurry within the porosity of the article;

firing the slurry to cause the binding agent to bind the ceramic powder and the emissivity-controlling agent to the interior of the porosity of the article;

applying a source of reactive phosphate ions to the surface of the article; and heating the surface of the article to cause the oxide and the source of reactive phosphate ions to react together.

18. The method according to claim 17, wherein said step of preparing a slurry comprises preparing a slurry wherein the emissivity-controlling agent is molybdenum disilicide.

19. The method according to claim 17, wherein said step of preparing a slurry comprises preparing a slurry wherein the oxide is cordierite ($MgAlSiO_3$).

20. The method according to claim 19, wherein said step of furnishing an article made of a first ceramic material comprises furnishing an article made of a first ceramic material formed by sintering silica, aluminoborosilicate and alumina fibers.

* * * * *